United States Patent
Kornylo et al.

(10) Patent No.: US 7,150,488 B2
(45) Date of Patent: Dec. 19, 2006

(54) INSTRUMENT PANEL HAVING FLEXIBLE STEERING WHEEL COLUMN CLOSEOUT

(75) Inventors: Walter Paul Kornylo, Livonia, MI (US); Timm Matthew Mooney, Brighton, MI (US); James Richard Lytle, Clarkston, MI (US)

(73) Assignee: Intier Automotive Inc., Aurora (CA)

( * ) Notice: Subject to any disclaimer, the term of this patent is extended or adjusted under 35 U.S.C. 154(b) by 172 days.

(21) Appl. No.: 10/490,499

(22) PCT Filed: Oct. 2, 2002
(Under 37 CFR 1.47)

(86) PCT No.: PCT/US02/31543

§ 371 (c)(1),
(2), (4) Date: Dec. 10, 2004

(87) PCT Pub. No.: WO03/029054

PCT Pub. Date: Apr. 10, 2003

(65) Prior Publication Data
US 2006/0214461 A1    Sep. 28, 2006

(51) Int. Cl.
*B62D 24/14* (2006.01)
(52) U.S. Cl. .......................................... 296/70; 280/779
(58) Field of Classification Search .................. 296/70, 296/193.02; 280/779, 782
See application file for complete search history.

(56) References Cited

U.S. PATENT DOCUMENTS

| 3,797,601 A | | 3/1974 | Barenyi et al. |
| 4,452,096 A | * | 6/1984 | Workman ................... 280/779 |
| 4,943,107 A | * | 7/1990 | Rhodes, Jr. .................. 296/70 |
| 5,067,747 A | | 11/1991 | Yokoyama |
| 5,280,956 A | * | 1/1994 | Tanaka et al. .............. 280/779 |
| 5,320,896 A | | 6/1994 | Smith |
| 5,376,216 A | | 12/1994 | Yoshioka et al. |
| 5,758,920 A | * | 6/1998 | Stephan ....................... 296/70 |
| 5,813,288 A | * | 9/1998 | Simonetti .................... 296/70 |
| 5,857,726 A | | 1/1999 | Yokoyama et al. |
| 5,884,875 A | * | 3/1999 | Hanada et al. ............. 248/27.1 |
| 5,951,045 A | * | 9/1999 | Almefelt et al. ............ 280/748 |
| 5,957,498 A | | 9/1999 | Holland et al. |
| 6,047,987 A | * | 4/2000 | Cart ........................... 280/779 |
| 6,073,987 A | | 6/2000 | Lindberg et al. |
| 6,129,406 A | | 10/2000 | Dauvergne |

(Continued)

FOREIGN PATENT DOCUMENTS

DE    38 41 187    6/1990

(Continued)

*Primary Examiner*—Kiran B. Patel
(74) *Attorney, Agent, or Firm*—Honigman Miller Schwartz and Cohn LLP

(57) ABSTRACT

An automobile instrument panel with a flexible steering column closeout and a method for assembling the same. The instrument panel is comprised of a structural backing member with a cavity formed therethrough for receiving a steering column. A flexible backing member is disposed over the cavity and attached to the structural backing. A layer of foam is then used to cover both the structural backing and the flexible backing. The foam layer retains the flexible backing against the structural backing, while creating a more aesthetic look for the instrument panel. An opening to accommodate the steering column is cut through both the foam layer and the flexible backing in an area located over the cavity portion of the structural backing, thereby forming a flexible closeout. The flexible closeout closes the gap between the steering column and instrument panel while still allowing for unimpeded displacement of the column relative to the instrument panel.

10 Claims, 2 Drawing Sheets

U.S. PATENT DOCUMENTS

| | | | |
|---|---|---|---|
| 6,186,887 B1 * | 2/2001 | Dauvergne | 296/208 |
| 6,193,271 B1 * | 2/2001 | Shimane | 280/728.3 |
| 6,517,145 B1 * | 2/2003 | Hedderly | 296/70 |
| 6,705,659 B1 * | 3/2004 | Suzuki et al. | 296/70 |
| 6,802,559 B1 * | 10/2004 | Yoshihara et al. | 296/70 |
| 2001/0024035 A1 | 9/2001 | Scheib et al. | |
| 2002/0017410 A1 | 2/2002 | Larsson et al. | |

FOREIGN PATENT DOCUMENTS

| | | |
|---|---|---|
| EP | 0 329 526 | 8/1989 |
| GB | 2 335 396 | 9/1999 |

* cited by examiner

INSTRUMENT PANEL HAVING FLEXIBLE STEERING WHEEL COLUMN CLOSEOUT

BACKGROUND OF THE INVENTION

1. Field of the Invention

This invention relates to an instrument panel for an automotive vehicle. More particularly, the invention relates to a flexible closeout cover molded with the instrument panel for surrounding the steering column of the vehicle and a method for assembling same.

2. Description of Related Art

An automotive vehicle includes an instrument panel and a steering column extending through an opening in the instrument panel. Generally, this opening must be large enough to provide for the full tilt of the steering wheel, which leaves a gap between the edge of the opening panel and the steering column. As a result, there is a need to shield the opening around the steering column for both aesthetics and to prevent access to the instrument panel. A closeout, or boot, generally surrounds the steering column for preventing such access to the instrument panel while still allowing for full travel and tilt of the steering wheel. An additional requirement is that the steering column be able to translate a specified axial distance upon impact by the occupant, such as in a frontal impact.

Current closeouts are generally either a flexible two-piece member or a rigid breakaway type. The two-piece members typically include a rigid collar with a flexible member extending inwardly therefrom, which allows the steering column unimpeded translational movement. However, the two-piece members are usually heat staked or otherwise adhered together, and over time and with use, the two pieces may become separated from each other and therefore allow access behind the steering column.

The rigid plastic-type closeouts generally surround the steering column and break off when the steering wheel moves in an axial direction. When the plastic cover breaks, it may cause side shifting of the steering column thereby partially reducing the transverse travel of the steering column.

Therefore, it would be beneficial if an integrated flexible closeout could be added to the instrument panel for an aesthetic way of restricting occupants from accessing the area behind the instrument panel for the life of the vehicle while allowing the steering column to translate into the instrument panel in a vehicle collision.

SUMMARY OF THE INVENTION

According to one aspect of the invention, there is provided an instrument panel for use in an automotive vehicle comprising a structural backing member for providing rigid support to the instrument panel. A cavity in the structural backing member is adapted to receive a steering column therethrough. A flexible backing member is secured to the structural backing immediately adjacent and covering the cavity. A foam layer is molded against the structural and flexible backing members for retaining a portion of the flexible backing member within the cavity thereby defining a flexible closeout between the structural backing member and the steering column extended therethrough.

According to another aspect of the invention, there is also provided a method of assembling an instrument panel to provide a flexible steering wheel closeout. The method involves providing a structural backing member and forming a cavity extending through the structural backing member. A flexible backing member is then attached against the structural backing member and secured to at least a portion of the structural backing member to cover the cavity therein. The flexible backing member and the structural backing member are covered with a layer of foam. An opening is cut through the foam layer and flexible backing member to form the flexible steering column closeout and allow unimpeded displacement of a steering column extending therethrough relative to the instrument panel.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
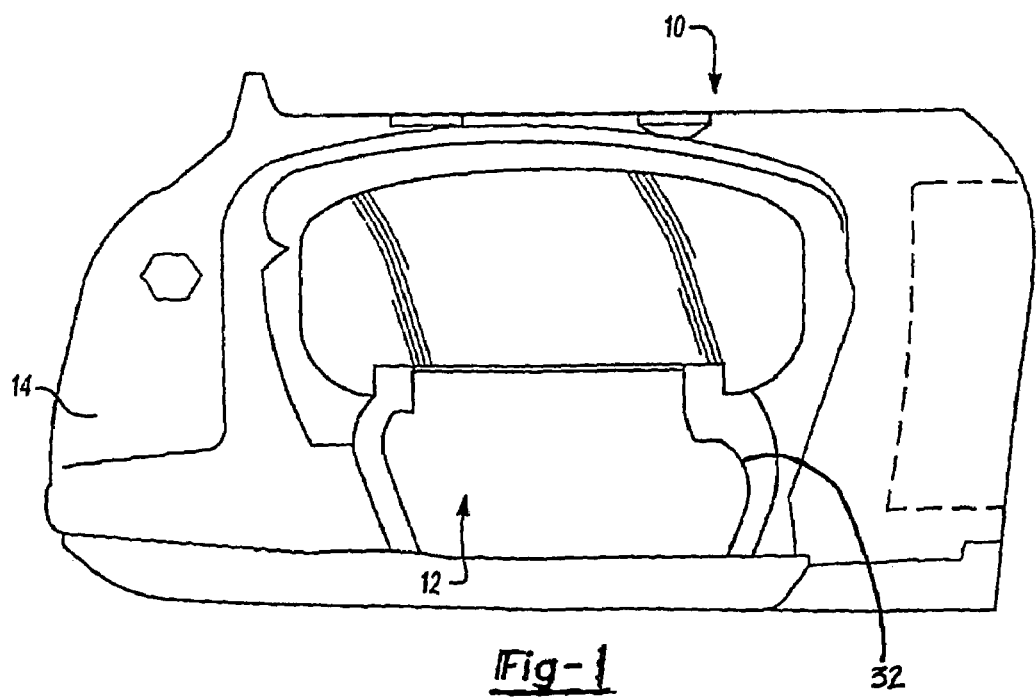
FIG. 1 is a front view of a structural backing of an instrument panel.

Referring to FIG. 1, an instrument panel for an automotive vehicle is generally shown at 10. The instrument panel 10 includes a cavity 12 for receiving and presenting a steering column 26 with a steering wheel fixedly attached thereto to an occupant of the vehicle.

Figure 2:
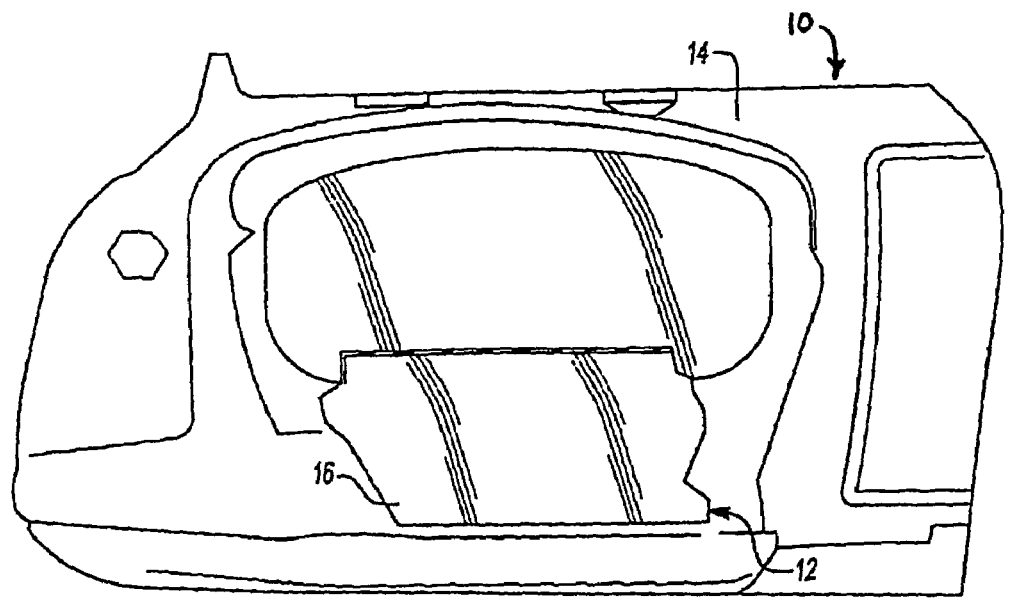
FIG. 2 is a front view of a structural backing of the instrument panel shown in FIG. 1 with a flexible backing member in place.

More specifically, the instrument panel 10 comprises a generally rigid structural backing 14, such as plastic or a natural fiber composite. The cavity 12 is defined by a peripheral edge 32 of the structural backing 14. The structural backing 14 is molded for allowing the cavity 12 to be of such a shape for allowing unimpeded translational movement of the steering wheel during a vehicle collision. Referring to FIG. 2, the structural backing 14 is inserted into a mold where the cavity 12 is covered by a flexible backing 16. The flexible backing 16 is shaped such as to completely cover the cavity 12 and may be held in place against the structural backing 14 by adhesives or a mechanical fastening means, such as a friction lock. One skilled in the art will recognize that the flexible backing 16 may be shaped to cover only the cavity 12 and a portion of the structural backing 14 surrounding the cavity 12, or may be shaped to extend and cover substantially all of the structural backing 14.

Figure 3:
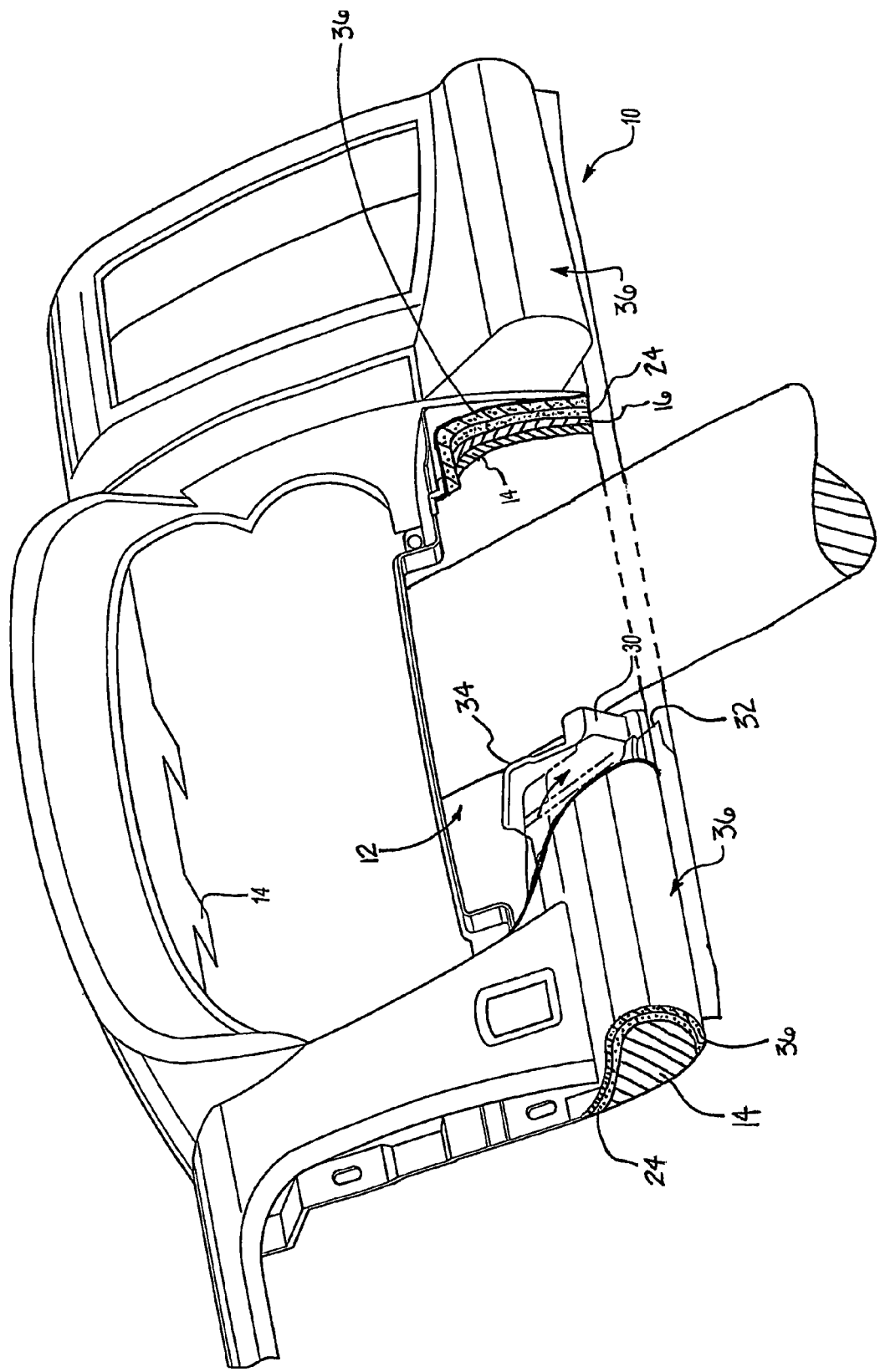
FIG. 3 is a front perspective view of the instrument panel shown in FIGS. 1 and 2 with a flexible closeout cover shown partially in cross-section.

Referring to FIG. 3, the structural backing 14 and the flexible backing 16 are then covered by a layer of foam 24, and possibly a trim cover 36, for integrating the structural backing 14 and flexible backing 16 together, and for providing an aesthetic appearance and feel to the instrument panel 10.

The required openings for the steering column 26 are then cut away from the combination of the foam 24 and flexible backing 16 located over the cavity 12 of the structural backing 14, thereby forming a flexible closeout 30 of the flexible backing 16 and foam 24 extending from the edge 32 of the structural backing 14 into the cavity 12. The flexible backing 16 is now secured against the structural backing 14 by the foam layer 24 and the flexible closeout 30 provides a barrier between the steering column 26 and the instrument panel 10.

In operation, if the vehicle were to be involved in a collision and an occupant were to contact the steering wheel, the forces on the steering wheel, and therefore, the steering column, may cause them to translate, or move axially. The flexible closeout 30 may flex such as to provide unimpeded travel of the steering column, thereby absorbing energy in a collision and helping to prevent injury to the occupant.

The method for assembling the instrument panel 10 begins with forming a cavity 12 through the structural backing member 14. Next, the flexible backing 16 is positioned over the cavity 12 and the flexible backing 16 is fastened to the structural backing 14. Attachment may be by adhesive bonding, mechanical fastening, friction lock, or the like.

The next step is to integrate the structural backing 14 and the flexible backing 16 together by covering both with a layer of foam 24. At this stage, a trim cover 36 may be attached over the foam 24 to provide a more aesthetic look and feel for the instrument panel 10.

The third step is to cut away the required opening 34, which defines the flexible closeout 30, for the steering column 26 through the foam 24 and the flexible backing 16. Finally, the steering column is extended through the opening 34 and the cavity 12 of the structural backing 14.

The above-described embodiment of the invention is intended to be an example of the present invention and alterations and modifications may be effected thereto, by those of skill in the art, without departing from the scope of the invention.

The invention has been described in an illustrative manner. It is to be understood that the terminology, which has been used, is intended to be in the nature of words of description rather than of limitation.

What is claimed is:

1. An instrument panel for use in an automotive vehicle comprising:
    a structural backing member for providing rigid support to said instrument panel;
    a cavity formed in said structural backing member for receiving a steering column therethrough;
    a flexible backing member fixedly secured to said structural backing member for covering at least a portion of said cavity; and
    a foam layer molded over said structural and flexible backing members for retaining said flexible member against said structural member and defining a flexible closeout around said cavity between said structural backing member and the steering column extending therethrough to allow unimpeded displacement of the steering column relative to said instrument panel.

2. The instrument panel as set forth in claim 1 wherein said cavity is further defined by a peripheral edge of said structural backing.

3. The instrument panel as set forth in claim 2 wherein said flexible closeout is further defined by said flexible backing member and said foam layer projecting from said edge into said cavity to provide a barrier and close the gap between the steering column and said instrument panel.

4. The instrument panel as set forth in claim 3 wherein said flexible backing member extends and covers only a portion of said structural backing member, including said cavity.

5. The instrument panel as set forth in claim 3 wherein said flexible backing member extends and covers substantially all of said structural backing member.

6. The instrument panel as set forth in claim 1, wherein said flexible backing member further includes an attachment portion for attaching said flexible backing to said structural backing.

7. The instrument panel as set forth in claim 6 wherein said flexible backing member is adhesively bonded to said structural backing member.

8. The instrument panel as set forth in claim 1 further including a trim cover molded over said foam layer.

9. The instrument panel as set forth in claim 1 wherein said structural backing member is composed of a plastic composite substrate.

10. The instrument panel as set forth in claim 1 wherein said structural backing member is composed of a natural fiber material.

* * * * *